April 14, 1942.  H. W. HEM  2,279,706
WEIGHING SCALE
Filed May 11, 1940  2 Sheets-Sheet 1
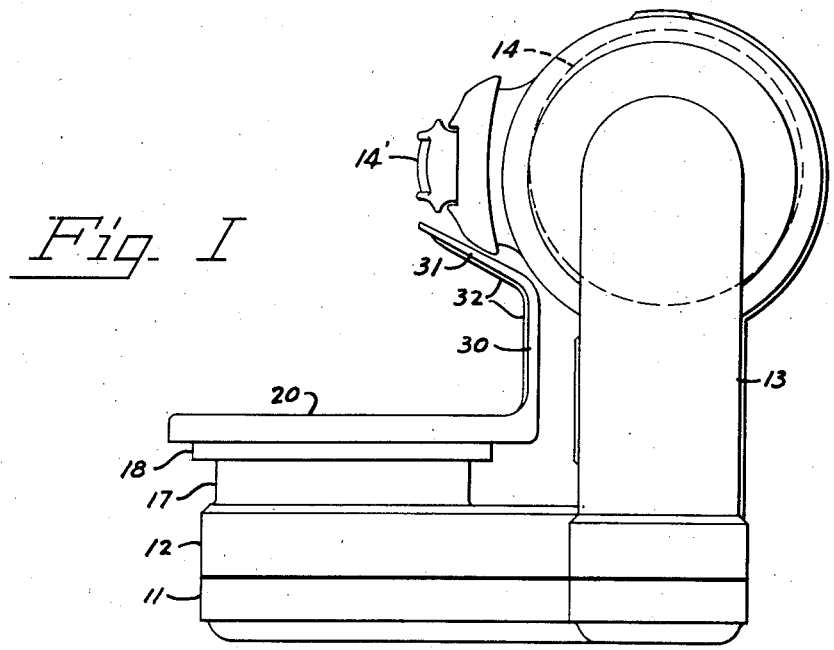
Fig. I
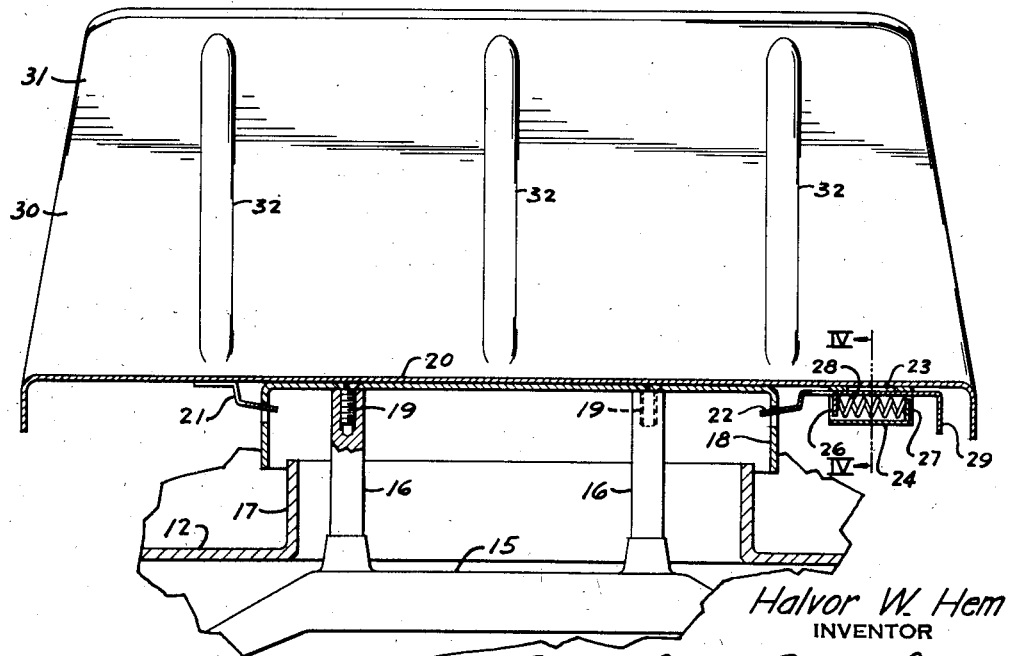
Fig. II
Halvor W. Hem
INVENTOR
BY Marshall & Marshall
ATTORNEYS

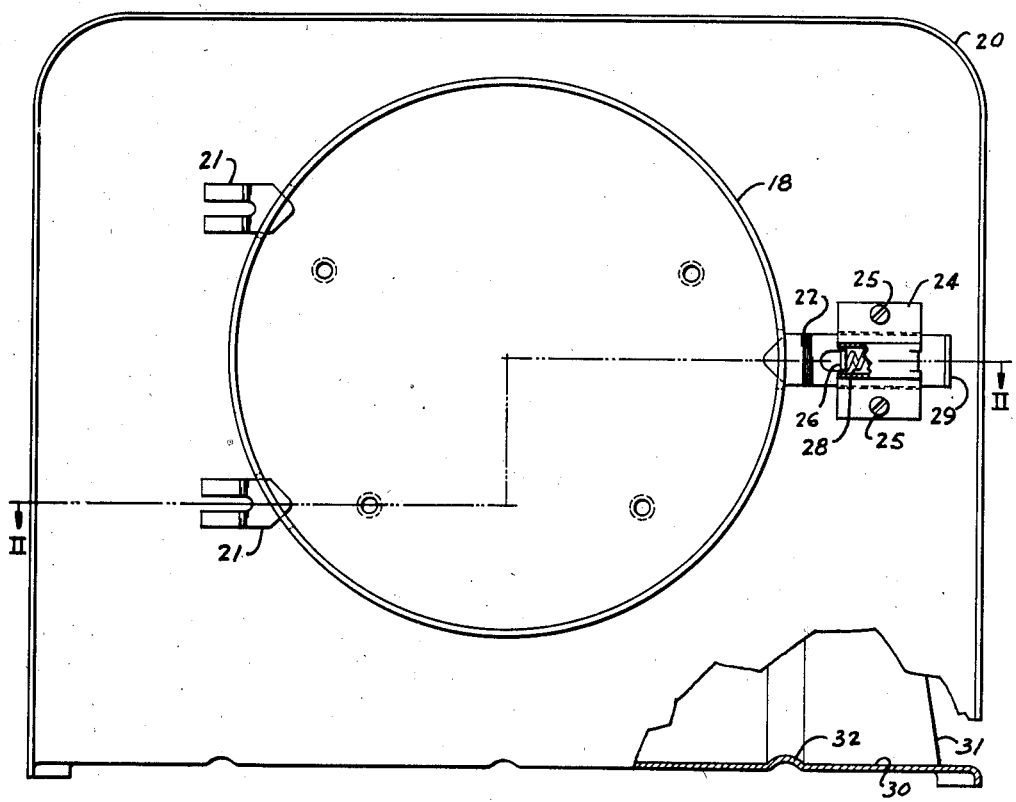
Fig. III
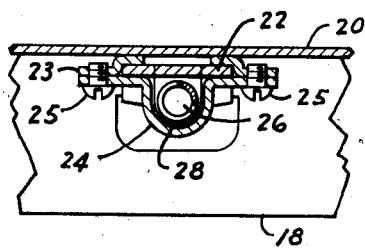
Fig. IV
Halvor W. Hem
INVENTOR
BY Marshall & Marshall
ATTORNEYS Patented Apr. 14, 1942

2,279,706

UNITED STATES PATENT OFFICE 2,279,706

WEIGHING SCALE

Halvor W. Hem, Toledo, Ohio, assignor to Toledo Scale Company, Toledo, Ohio, a corporation of New Jersey Application May 11, 1940, Serial No. 334,605

2 Claims. (Cl. 265—27)

This invention relates generally to weighing scales, and more particularly to computing weighing scales of the cylindrical type. Due to the now general use of high refrigerator type counters in food shops it is necessary that scales of this type be of extremely low construction so that the indicating line, which is stretched in front of the cylindrical computing chart, be at approximately eye level. It is not practical to reduce the diameter of the indicating chart, nor is it possible to greatly reduce the height of the base casing since the load receiving lever mechanism requires a certain space. The necessary reduction in height must therefore be obtained by reducing the height of the vertical casing between the chart casing and the horizontally disposed base casing. This vertical casing portion usually contains the load counterbalancing mechanism which can be redesigned or rearranged to permit the reduction in height. The height from the load receiving platter to the overhanging portion of the cylindrical chart casing thus may be reduced to substantially less than the fore and aft length of the platter. This results however in that the space between the load receiving platter surmounting the base casing and the overhanging portion of the chart casing is comparatively small and there is therefore a possibility that a relatively large object when placed on the platter, for example a ham, may be pushed against the receding surface of the overhanging cylindrical casing so that a wedging action takes place and the platter is forced downwardly causing the scale to indicate or register a weight greater than the actual weight.

The principal object of this invention is therefore the provision of improved means in scales of the type referred to for obviating such incorrect indications.

Another object is the provision of an improved load receiving platter.

These, and other objects and advantages will be apparent from the following description in which reference is had to the accompanying drawings, illustrating a preferred embodiment of the invention and in which similar reference numerals refer to similar parts throughout the several views.

In the drawings:

Fig. I is a side elevational view of a device embodying the invention.

Fig. II is an enlarged fragmentary sectional view, the section being along the line II—II of Fig. III and showing in detail the means for retaining the load receiving platter.

Fig. III is an enlarged fragmentary view of the bottom of the load receiving platter showing in greater detail the location of the platter retaining means; and, Fig. IV is a fragmentary sectional view, the section being along the line IV—IV of Fig. II.

Referring to the drawings in detail:

Since the invention is not dependent on any particular type of weighing scale and since the scale in which the invention is shown embodied is of a well known type it will be described herein only to such extent as to fully disclose the invention.

The scale comprises a base plate 11 upon which a load supporting lever system (not shown) is mounted in the usual manner. This lever system is housed in a casing 12 mounted upon and fastened to the base plate 11. A load counterbalancing mechanism (not shown) is housed in a short relatively shallow portion of a vertical casing 13 which extends upwardly from the base casing 12 and has a bulging upper portion adapted to contain a cylindrical chart 14. This bulging portion is provided with an opening 14' through which the chart may be viewed.

The lever system within the base casing 12 is provided with the usual load pivots which are engaged by a platter supporting spider 15 in the usual manner. This supporting spider 15 (Fig. II) is provided with a plurality of posts 16 which are studded therein and project upwardly through an opening in the top of the base casing 12. To prevent dust and water gaining access into the interior of the scale this opening is surrounded by an upwardly extending wall 17, and a dish-like member 18 is secured by screws 19 to the upper ends of the posts 16 and its downwardly directed flange telescopes the wall 17. The dish-like member 18 forms a support for a load receiving platter 20. This platter is retained in proper position by two substantially Z-shaped clips 21, each having one of its horizontal arms welded to the underside of the platter and the other of its arms entering properly located slots in the wall of the dish-like member 18. A spring-pressed clip 22, mounted beneath the opposite side of the platter 20, is also adapted to enter a slot in this wall. This clip 22 is slidably seated in ways formed by a bracket 23 spot-welded to the platter, and a formed channel-like member 24 (Fig. IV) which is secured to the bracket 23 by means of screws 25. The clip 22 has an integral ear 26 bent downwardly at right angles to its principal plane and extending into the channel of the member 24 and the rear end of this member 24 is provided with an ear 27 bent upwardly. These ears are adapted to engage the ends of a compression spring 28 lying in the channel, which spring urges the clip 22 in one direction into engagement with the slot in the wall of the dish-shaped member 18. When it is desired to remove the platter the slidable clip 22 is drawn backwards by means of its end 29, which is bent to form a finger grip, against the tension of the spring 28. This withdraws the end of the clip 22 from the slot and the entire platter is then moved laterally until the clips 21 disengage from their respective slots. The platter can then be lifted vertically from its support.

Since the available space for a scale on modern refrigerating counters is limited the base must be made as short as possible but since large load receiving platters are required it will be noted that the platter 20 extends within a short distance of the casing 13 and underneath its bulging portion.

To prevent an article of substantial size from being pushed against the receding wall of the overhanging bulging portion of the casing 13 and thus permitting a wedging action to take place which forces the platter 20 downwards against the resistance of the load counterbalancing mechanism, the rear of the platter is provided with a guard comprising a vertical portion 30 and a portion 31 bent angularly thereto. The angular portion of this guard extends adjacent the bulging overhanging portion of the casing 13 for such a distance that an article placed on the platter 20 and pushed backwardly will be wedged against this angularly extending portion 31 rather than against the bulging portion of the casing 13. Thus indications of a higher magnitude than the actual weight of the article will be prevented.

For sanitary reasons, as well as to prevent wrapping paper or portions of the article being weighed from projecting through openings in the guard and rubbing on the casing, the guard is preferably made as an integral portion of the platter and imperforate; furthermore, at times it is desirable to stiffen the guard portion, for example by one or more shallow ribs 32 formed therein.

Having described the invention, I claim:

1. In a device of the class described, in combination, a base, a casing mounted at the rear end of said base, said casing having an overhanging bulging portion adapted to house a cylindrical chart, means for viewing said chart lying along the front of said overhanging bulging portion, a commodity-receiver having a platter portion extending beneath said overhanging bulging portion, the means for viewing said chart lying above said platter portion, said commodity-receiver having a guard rising vertically from the rear end of said platter portion and extending adjacent the forward side of said casing, said guard having a portion extending thence angularly forwardly and upwardly and closely underlying said bulging portion of said casing and the means for viewing said chart, whereby purposeful wedging of commodities between said platter portion and said bulging portion, or the means for viewing said chart, is prevented.

2. In a device of the class described, in combination, a base, a casing mounted at the rear end of said base, said casing having an overhanging bulging portion adapted to house a cylindrical chart, means for viewing said chart lying along the front of said overhanging bulging portion, a commodity-receiver having a platter portion extending beneath said overhanging bulging portion, the means for viewing said chart lying above said platter portion, said commodity-receiver having a guard rising vertically from the rear end of said platter portion and extending adjacent the forward side of said casing, said guard having a portion extending thence angularly forwardly and upwardly and closely underlying said bulging portion of said casing and the means for viewing said chart, whereby purposeful wedging of commodities between said platter portion and said bulging portion, or the means for viewing said chart, is prevented, the platter portion and guard of said commodity-receiver being integral and having an integral marginal stiffening flange extending along their edges.

HALVOR W. HEM.